Patented May 31, 1949

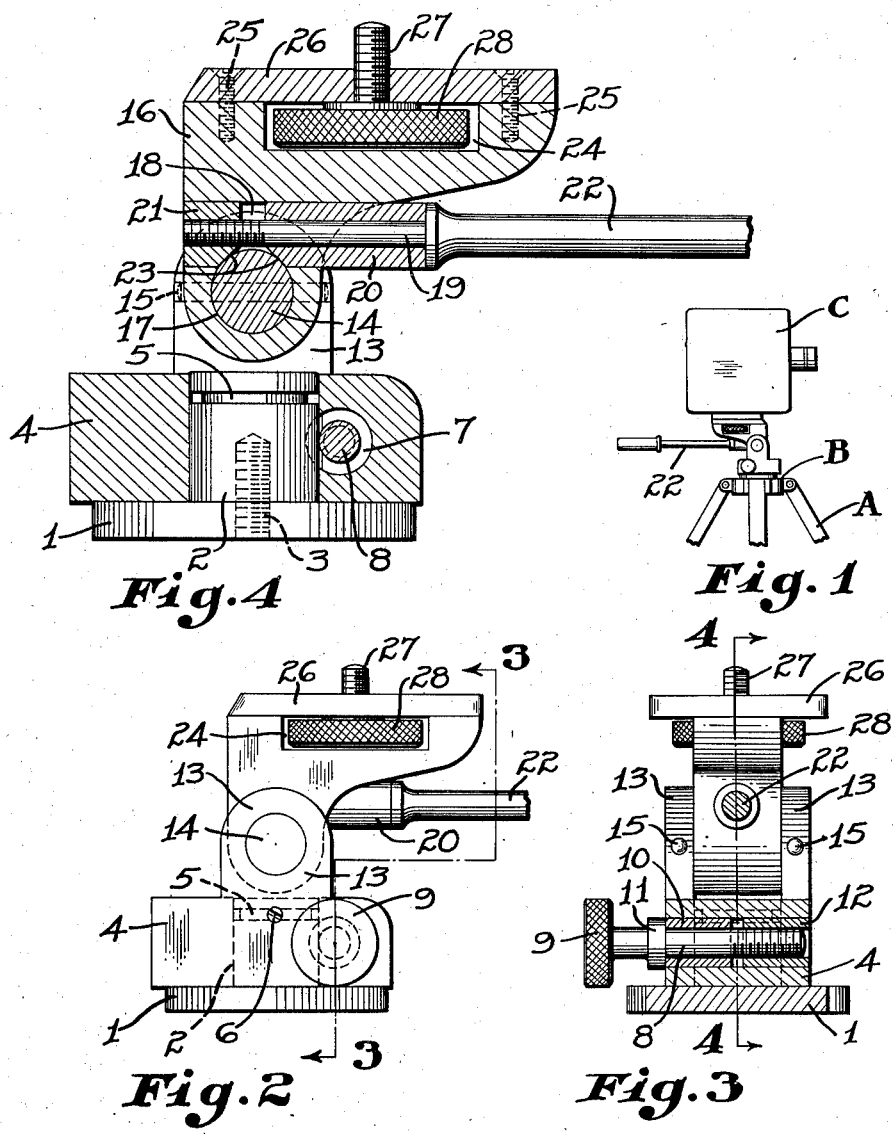

2,471,886

UNITED STATES PATENT OFFICE 2,471,886

CAMERA TRIPOD HEAD

Ralph I. Nielsen, Los Angeles, Calif.

Application July 5, 1946, Serial No. 681,481

3 Claims. (Cl. 248—183)

My invention relates to camera tripod heads and included in the objects of my invention are:

First, to provide a camera tripod head adapted to be interposed between a conventional tripod and a camera and designed so that it may be adjusted with great facility so that a minimum of time is lost in orienting the camera in the desired direction, thus providing a device which is particularly suitable in the situations wherein the camera must be set-up and directed under conditions in which the time element is a dominant factor.

Second, to provide a camera tripod head interposed between a conventional tripod and its camera to permit adjustment of the camera angle even though in setting up the tripod its mounting face is not horizontal.

Third, to provide a camera tripod head which incorporates a novel and effective clamp means whereby the camera may be firmly secured in any selected position.

With the above and other objects in view as may appear hereinafter, reference is directed to the accompanying drawings, in which:

Figure 1 is a reduced elevational view of a camera and its tripod with my tripod head interposed therebetween.

Figure 2 is a side elevational view of my tripod head.

Figure 3 is a partial elevational, partial sectional view thereof taken through 3—3 of Figure 2.

Figure 4 is an enlarged sectional view thereof taken through 4—4 of Figure 3.

The conventional tripod indicated by A in Figure 1 is provided with a mounting plate B through which extends a screw adapted to thread into a hole provided in a camera C. My mounting head is interposed between the tripod and the camera and includes a base fitting 1 adapted to rest on the mounting plate B. The base fitting is provided with a central upwardly directed journal 2 into which extends a threaded socket 3 adapted to receive the conventional screw carried by the mounting plate B.

A collar 4 rests on the base fitting 1 and rotates about the journal 2. The journal is provided with a groove 5 and a set screw 6 extends through the collar 4 and into the groove 5.

The collar 4 is provided with a clutch bore 7 extending at right angles to and laterally offset from the axis of the journal 2. The clutch bore 7 intersects a side of the central opening of the collar 4 so that a portion of the journal 2 is exposed to the bore 7. The clutch bore 7 receives a stem 8 threaded at one extremity and provided with a handle 9 at its other extremity. The stem 8 receives a clutch sleeve 10 which bears against a shoulder 11 at the juncture of the stem 8 and handle 9. The extremity of the stem 8 receives a clutch nut 12.

Operation of the clutch formed by the stem 8, clutch sleeve 10 and clutch nut 12 will be described in more detail hereinafter.

Extending upwardly from the collar 4 is a pair of supports 13 which form a yoke and is connected by a shaft 14. The shaft 14 is secured against rotation relative to the supports 13 by means of pins 15.

A mounting block 16 having a bore 17 adapted to fit the shaft 14 extends between the supports 13. The mounting block is adapted to rotate on the shaft 14 and is provided with a clutch bore 18 extending at right angles to the shaft 14 in offset relation thereto. A stem 19 extends into the bore 18 and is provided with a clutch sleeve 20 and clutch nut 21. A handle 22 extends from the stem 19 and forms a shoulder against which the clutch sleeve 20 bears. The confronting ends of the clutch sleeve 20 and clutch nut 21 are beveled at their lower sides as indicated by 23 to engage the shaft 14. The beveled faces 23 serve to prevent rotation of the clutch sleeve and clutch nut when the stem 19 is rotated so that these faces may be drawn together or moved apart as the stem is rotated in order to grip or release the shaft 14.

The clutch means between the base fitting 1 and collar 4 is provided with similar beveled faces 23, not shown, so that the first-described clutch structure functions in the same manner as the later described clutch structure.

The upper portion of the mounting block 16 projects backwardly, that is, in the direction of the handle 22 and is provided with a transverse slot 24. Secured to the upper side of the mounting block by screws 25 and covering the slot 24 is a top plate 26 having a hole therethrough which admits the threaded stem 27 of a thumb screw 28, the head of which is contained within the slot 24. The diameter of the thumb screw is larger than the width of the block 16 so that it may be readily engaged in order that the stem may be screwed into the bottom of the camera.

My mounting head is employed as follows:

The clutch between the collar 4 and the journal 2 is adjusted to provide sufficient friction to enable the collar 4 to remain in any set position, but preferably not tight enough to prevent rotation of the collar, by use of the handle 22 which is preferably relatively long to provide ample leverage. By moving the handle 22 laterally, angular adjustment of the camera is obtained and by raising or lowering the handle 22 the camera may be tilted up or down. This is done with the clutch which connects the mounting block 16 to the shaft 14 in a loosened condition. When the desired camera angle is obtained, a slight turn of the handle 22 locks the mounting block 16 on its shaft. It will thus be seen that the camera may be readily and quickly directed in the manner desired.

Many other embodiments of the invention may be resorted to without departing from the spirit of the invention.

I claim:

1. A camera tripod head, comprising: a base member adapted for attachment to a tripod and having an upstanding journal; a lower body member revolubly mounted on said journal; an upper body member; hinge means connecting said upper body member to said lower body member for movement about a horizontal axis, said means including a journal; means defining a passageway extending in offset transverse relation to the axis of each of said journals; a clutch means for each journal, including a clutch stem extending into each passageway, a clutch sleeve journalled on said stem a clutch nut threaded on said stem, the confronting ends of each nut and its sleeve being beveled for engagement with their corresponding journal, each of said clutch means adapted to be tightened or loosened by rotation of its stem.

2. A camera tripod head, comprising: a pair of body members; a hinge including a horizontal journal shaft secured in one body member and rotatably supporting the other of said body members, said other body member having a bore traversing the axis of said journal in substantially tangential relation; a handle member including a stem extending into said bore; a sleeve on said stem; a nut threaded on the extremity of said stem, the confronting ends of said sleeve and nut being beveled and positioned to bear against the journal shaft of said hinge and restrained thereby against rotation whereby upon rotation of said stem said sleeve and nut are moved toward and away from each other to bind or release said journal shaft.

3. A camera tripod head, comprising: a base member adapted for attachment to a tripod and having an upstanding journal; a collar fitting said journal, and including an upwardly directed pair of supports; a journal shaft secured to and extending between said supports; a block including means for attachment to a camera, a bearing fitting said journal and defining a transverse bore offset from the axis of said journal; a handle member including a stem extending into said bore; a sleeve on said stem; a nut threaded on the extremity of said stem, the confronting ends of said sleeve and nut being beveled and positioned to bear against the journal shaft of said hinge and restrained thereby against rotation whereby upon rotation of said stem said sleeve and nut are toward and away from each other to bind or release said journal shaft.

RALPH I. NIELSEN.

REFERENCES CITED

The following references are of record in the file of this patent:

UNITED STATES PATENTS

| Number | Name | Date |
| --- | --- | --- |
| 1,138,368 | Feeley | May 4, 1915 |
| 1,948,055 | Thalhammer | Feb. 20, 1934 |
| 2,318,910 | Zucker | May 11, 1943 |